United States Patent Office 2,799,553
Patented July 16, 1957

2,799,553

PHOSPHATE METHOD FOR SEPARATION OF RADIOACTIVE ELEMENTS

Stanley G. Thompson and Glenn T. Seaborg, Chicago, Ill., assignors to the United States of America as represented by the United States Atomic Energy Commission No Drawing. Application March 9, 1943, Serial No. 478,570

6 Claims. (Cl. 23—14.5)

The invention relates to methods for separating element 94 (also called plutonium, symbol Pu) from foreign materials such as uranium, fission products, and element 93 (the latter element also being called Neptunium, symbol Np).

The principal object of the invention is to provide new and improved means for extracting element 94 from neutron irradiated uranium in which element 94 is present in low concentration.

Another object is to provide a method which will avoid the use of highly corrosive chemicals and which will give a precipitate which is easy to separate from solutions, either by centrifugation or filtration.

Other objects and advantages of the invention will become apparent as the following detailed description progresses.

We have discovered that the solubility of plutonium phosphate in acid solution is much less than that of uranium phosphate and the phosphates of many of the fission products. In solutions of acidity such that uranium phosphate and many of the fission products will not precipitate, such as in 1 N sulphuric acid, plutonium phosphate when present in concentration above about 20 mg. per liter will precipitate. Separation from uranium and many of the fission products, particularly rare earth fission products, may be readily effected by simply adding an excess of phosphate ion to the acid solution.

In a neutron irradiated uranium as it is usually made, either by bombardment with neutrons from a cyclotron or by the chain reaction in a uranium lattice system for periods of about a month, the concentration of plutonium is so low that solution will contain the plutonium phosphate in concentrations below its limit of solubility.

The extraction of plutonium from neutron irradiated uranium in which the plutonium is present in extremely low concentration may be effected by precipitating the plutonium as a phosphate with the aid of a carrier. In general, suitable carriers are phosphates which are relatively insoluble in acid solutions in which uranium phosphate is soluble.

One such carrier which was tried in our earlier experiments was zirconium phosphate. This material gave practically quantitative separation of the plutonium when the plutonium was present in tracer amounts. However, in concentrations of above tracer amounts of plutonium, such as in concentrations of $10^{-7}$ or $10^{-4}$ grams of plutonium per cc. of solution, the precipitation of the plutonium as plutonium phosphate with the zirconium phosphate was not complete. Furthermore, on standing the precipitate of zircnium phosphate containing the 94 lost part of its 94 content. Therefore, while useful separation of plutonium may be effected in dilute solutions by means of zirconium phosphate as a carrier, particularly under rigorously controlled conditions of acidity and concentration of uranium, the methods involving the use of zirconium phosphate as a carrier are not so satisfactory as others methods of separation. An attempt, therefore, was made to find other carriers which would give better results in concentrations of plutonium above tracer concentrations and below the concentrations in which separation may be effected without any carrier.

We discovered after considerable experimentation that a phosphate which seemed, prior to actual trial, to have the least expectation of being successful because, in part, of its relatively soluble characteristics was as a matter of fact eminently suitable for effecting a separation of plutonium. This phosphate is bismuth phosphate. It is believed that the principal reason for its suitability is that the bismuth phosphate precipitate is isomorphous with plutonium phosphate. Bismuth phosphate also forms a crystalline precipitate as compared to the flocculent precipitate of zirconium phosphate. In general, it may be stated that the most suitable carriers in our process are phosphates which form isomorphic precipitates with plutonium phosphate and which are of crystalline character.

The bismuth phosphate precipitate containing element 94 is dense, crystalline, and readily separated from the solution by filtration. Furthermore, it carries 94 effectively, our experiments showing that element 94 is precipitated to the extent of 95%, or greater, with bismuth phosphate at Bi:94 ratios varying from 20 to 200,000.

The following experiment and accompanying table is given to show that bismuth phosphate has a very high carrying power for element 94 in concentrations ranging from slightly above tracer concentrations to concentrations where a carrier is not needed; i. e., where the concentration of plutonium exceeds the solubility of plutonium phosphate in the solution.

EXAMPLE

A uranyl nitrate solution containing 20% uranyl nitrate hexahydrate, 25 m. $Bi^{+3}$ per 10 ml., and 1 N in $HNO_3$ was prepared. To small volumes (100, 10 or $1\times10^{-3}$ cc.) of this was added appropriate quantities of $Pu^{+4}$ (as a solution of the nitrate) to obtain the desired Bi:Pu ratio ($Pu^{+4}$ refers to plutonium in its lower oxidation state in which it is insoluble in the presence of phosphate ion). This was followed by the addition of sufficient 3.6 M $H_3PO_4$ to make the solution 0.36 M in $H_3PO_4$. The solutions were heated at 90° for 45 minutes and then centrifuged. Aliquots of the supernatant liquid were taken for alpha-counting. The precipitates were washed 3 times with .04 cc. of 3.6 M $H_3PO_4$, dissolved in concentrated HCl and transferred to platinum dishes for alpha-counting. The 94 in the aliquots of the supernatant liquids were separated from uranium by $LaF_3$ precipitation. Results of the experiments are summarized in the table below.

*Table A*

| Ratio Bi:Pu | Activity recovered in the supernatant solution [2] (Counts per minute) | Activity recovered in the bismuth phosphate precipitate (Counts per minute) | Percent 94 precipitated |
|---|---|---|---|
| 17:1 | 130 | 11,920 | [1] 98.9 |
| 120:1 | 92 | 6,300 | 98.5 |
| 150:1 | 92 | 13,800 | 99.4 |
| 1,600:1 | 184 | 12,500 | 98.5 |
| 28,000:1 | 12 | 744 | 98.4 |
| 150,000:1 | 6 | 134 | 95.5 |

[1] The concentration of Pu in this experiment was such as to probably exceed the solubility of plutonium phosphate in uranyl nitrate.
[2] These counts are corrected for a uranium blank by subtracting 18 counts per minute obtained by precipitating $4 \times 10^{-4}$ grams of La as the fluoride in the presence of uranyl nitrate containing no Pu.

In accordance with one embodiment of this invention, the extraction of plutonium is carried out in neutron irradiated uranium metal, such as that obtained by the nuclear chain reaction of neutrons on uranium metal in a lattice system in which the uranium has been reacted with neutrons of high intensity for a sufficient time such that the element 94 is present in above tracer amounts, as, for example, a concentration of 0.01% by weight of element 94. The element 93 is present in minor amounts compared to the 94 and the fission products are chiefly $Sr^{89}$, Y (57 day half life), Zr, Cb, and Ru of the group of atomic numbers from 35–44: and $Te^{127}$, $Te^{129}$, $I^{131}$, $Xe^{133}$, Cs (many years half life), Ba (12 day half life), $La^{140}$, and Ce of 20 day and 200 day half lives from the group of atomic numbers from 51–58, incl.

In accordance with the preferred embodiment of this invention the neutron irradiated uranium is dissolved in nitric acid to form uranyl nitrate hexahydrate and nitrates of plutonium, neptunium and the various fission products. This composition is dissolved in acid, preferably sulphuric acid, and the acidity adjusted to about 1 normal on the basis of the added sulphuric acid. The concentration of uranyl nitrate hexahydrate is also preferably regulated so that it is below about 22% in order to keep the loss of element 94 to a minimum.

Bismuth nitrate or other compound which furnishes $Bi^{+3}$ ions is then added to the solution to produce a concentration of $Bi^{+3}$ of about 25 mg. of $Bi^{+3}$ per 10 cc. of solution. The concentration of $Bi^{+3}$ may be varied quite widely and with sulphuric acid a concentration of 10 mg. of $Bi^{+3}$ per 10 cc. of solution will precipitate with phosphate ion carrying element 94 without appreciable loss.

Phosphoric acid is added to the solution in amount such as to precipitate bismuth and plutonium phosphates. A suitable concentration of phosphoric acid for solutions such as described above is about .36 molar.

The total acid concentration should be such that the uranyl phosphate formed will not precipitate, but the bismuth phosphate and 94 phosphate will precipitate together. An acid concentration on the basis of added sulphuric or nitric acid of about 1 N is suitable. Below about .85 N added sulphuric or nitric acid concentration, the precipitation of bismuth phosphate starts to take place and above about 1.25 N, on the basis of added acid, the complete precipitation of bismuth phosphate and plutonium does not take place.

The use of sulphuric acid is preferable to nitric acid for adjusting the acidity since the possible precipitation of uranium phosphate is further prevented by formation of complex ions or undissociated molecules between sulphate and uranyl ions. However, a source of sulphate ions other than sulphuric acid can be used such as $Na_2SO_4$ to satisfy these requirements.

The above solutions are preferably heated, for example to about 90° centigrade for one hour, whereupon a substantially complete precipitation of the bismuth phosphate takes place carrying with it substantially all of the 94 phosphate.

In addition to carrying down the plutonium phosphate, the bismuth phosphate also carries down a portion of the neptunium phosphate.

The bismuth phosphate also carries down a portion of the fission products, principally zirconium and columbium radioactive elements, the rare earth and similar radioactive fission products largely remaining in the filtrate.

The following tables show the effect of changing various factors. The need of changing these factors has been discussed above in a general way and the tables are given by way of illustration and not to limit the invention. Unless otherwise specified the conditions of the experiments below were as follows: 20% $UO_2(NO_3)_2.6H_2O$, 1 N $HNO_3$ or $H_2SO_4$, 0.36 M $H_3PO_4$, 25 mg. $Bi^{+3}$ per 10 cc., temperature of precipitation 95° C., time of heating during precipitation 1 hour.

Table I
EFFECT OF VARIATION IN $H_3PO_4$ CONCENTRATION

| $H_3PO_4$ concentration (Molar) | .72 | .54 | .36 | .18 | .12 | .09 | .06 | .03 |
|---|---|---|---|---|---|---|---|---|
| 1 N $HNO_3$—Percent 94 in $BiPO_4$ | 99 | 99 | 100 | 99 | 95 | 68 | 3 | 0 |
| 1 N $H_2SO_4$—Percent 94 in $BiPO_4$ | | | 99 | 93 | 88 | | 66 | 0 |

Table II
TIME OF HEATING AT 95° C.

| Time at 95° C. | 5 min. | 10 min. | 15 min. | 20 min. | 30 min. | 60 min. | 2 hrs. | 5 hrs. | 8 hrs. |
|---|---|---|---|---|---|---|---|---|---|
| 1 N $HNO_3$—Percent 94 in $BiPO_4$ | | | | 97 | | 99 | 97 | 99 | 100 |
| 1 N $H_2SO_4$—Percent 94 in $BiPO_4$ | 98 | 99 | 99 | | 99 | 99 | | | |

Table III
VARIATION IN ACID CONCENTRATION

| Acid normality ($H_2SO_4$ or $HNO_3$) | .75 | 1.00 | 1.25 | 1.50 | 1.75 | 2.00 | 2.25 |
|---|---|---|---|---|---|---|---|
| $HNO_3$—Percent 94 in $BiPO_4$ | 100 | 99 | 98 | | 64 | | 2 |
| $H_2SO_4$—Percent 94 in $BiPO_4$ | | 99 | 96 | 92 | 93 | 89 | |

Table IV
EFFECT OF VARIOUS PRECIPITATION TEMPERATURES FOR ONE HOUR

| Temperature | 25° C. | 40° C. | 60° C. | 80° C. | 95° C. |
|---|---|---|---|---|---|
| 1 N $HNO_3$—Percent 94 in $BiPO_4$ | (¹) | 53 | 97 | 100 | 99 |
| 1 N $H_2SO_4$—Percent 94 in $BiPO_4$ | 55 | 85 | 98 | 99 | 99 |

¹ Slight precipitate.

Table V
VARIATION IN AMOUNT OF BISMUTH CARRIER—IN 1 N $H_2SO_4$ ONLY

| Mg $Bi^{+3}$/10 cc | 25 | 20 | 15 | 10 |
|---|---|---|---|---|
| Percent 94 in $BiPO_4$ | 99 | 98 | 98 | 96 |

Table VI
VARIATION IN $UO_2(NO_3)_2.6H_2O$ CONCENTRATION—IN 1 N $H_2SO_4$ SOLUTION ONLY

| Percent $UO_2(NO_3)_2.6H_2O$ | 0.0 | 10.0 | 12 | 17.6 | 20.0 | 22.4 | 26.0 | 30.0 |
|---|---|---|---|---|---|---|---|---|
| Percent 94 in $BiPO_4$ | 99 | 100 | 100 | 99 | 98 | 95 | 95 | 74 |

Table VII
COMBINATIONS OF $HNO_3$, $H_2SO_4$, AND $Na_2SO_4$

| $H_2SO_4$ normality | $HNO_3$ normality | $Na_2SO_4$ normality | Percent 94 in $BiPO_4$ |
|---|---|---|---|
| 0.75 | .25 | 0 | 99 |
| 1.0 | 0 | .15 | 98 |
| 1.0 | 0 | .30 | 97 |
| 1.0 | 0 | .50 | 98 |

The following example is given to aid in the explanation of the invention and is not intended to limit the invention to the details described therein.

EXAMPLE

*Procedure and results.*—9.4 cc. of solution is prepared containing 2.5 gm. of $UO_2(NO_3)_2.6H_2O$, 1 cc. of 10 N $H_2SO_4$, and 25 mg. of $Bi^{+3}$ (58 mg. $Bi(NO_3)_3.5H_2O$). 0.6 cc. of 6 M $H_3PO_4$ is then added. The solution is heated to 95° C. and maintained at this temperature for 1 hour. The $BiPO_4$ is separated from the solution by filtration or centrifugation, and is then dissolved in about 1 cc. concentrated HCl. The HCl solution is diluted to about 10 cc. and the 94 precipitated with HF using La$^{+3}$ carrier.

In terms of a large scale process, the quantities of chemicals used in the BiPO$_4$ precipitation would be approximately as follows:

Weight of uranium present as the metal=2,000 lbs.
Volume of solution after H$_3$PO$_4$ addition=2,150 gals.
Amount of sulphuric acid (conc. 96%—37N)=58 gals. (893 lbs.)
Weight of Bi(NO$_3$)$_3$·5H$_2$O=106 lbs.
Weight of H$_3$PO$_4$ (concentrated 85%)=52 gals. (740 lbs.)

Using the method described above consistent recovery of 94 to the extent of about 98% has been obtained. The BiPO$_4$ precipitate contains about 17% of the gamma-fission activity from a fission mixture (uranium metal bombarded for about 40 days with neutrons from 12 Mev. deuterons on beryllium) 60 days after bombardment. This activity corresponds to about one-third of the total Zr, Cb fission activity present in the sample. The final LaF$_3$ precipitate contains about 5% of the gamma- and about 8% of the beta-fission activity present in this same sample.

The bismuth phosphate precipitate obtained in the above procedure is separated from the filtrate by filtration, washed and is dissolved in hydrochloric acid and lanthanum nitrate is added as a carrier. Hydrofluoric acid is added and the plutonium in its reduced state precipitates with the lanthanum as a fluoride. The fluoride precipitate is then separated by centrifugation or other means. Thus, the plutonium is separated from the bismuth which remains in the filtrate.

The plutonium may be separated from the lanthanum and further purified by carrying out successive oxidation and reduction steps, reducing the amount of carrier at each stage until in the final step, the plutonium is precipitated as pure plutonium fluoride.

Instead of using the fluoride oxidation and reduction procedure as described above and in the below-mentioned application, other procedures may be used.

While there has been described certain embodiments of our invention, it is to be understood that it is capable of many modifications. Changes, therefore, may be made without departing from the spirit and scope of the invention as described in the appended claims, in which it is the intention to claim all novelty in the invention as broadly as possible, in view of the prior art.

This case is related, in that it discloses closely-related subject matter, to copending application Serial No. 519,714, filed January 26, 1944, by Stanley G. Thompson et al. and assigned to the assignee of the instant application.

We claim:
1. The method of separating plutonium from uranium in a solution comprising plutonium, uranium, and bismuth which comprises introducing into the solution a compound supplying phosphate ions whereby plutonium and bismuth phosphate are precipitated, the solution being at an acidity such that the uranium remains in solution.

2. The method of separating plutonium from uranium which comprises forming a solution comprising plutonium, uranium, bismuth and sulphate ions and precipitating bismuth, together with plutonium by introducing phosphoric acid, the solution being at an acidity such that uranium remains in solution.

3. The method of extracting plutonium from neutron irradiated uranium containing plutonium in low concentration which comprises forming a nitric and sulphuric acid solution of the neutron irradiated uranium containing uranyl nitrate and plutonium, adding a compound supplying bismuth ion and phosphate ion, and regulating the concentration of the uranium to below about 1.1 Normal and regulating the acidity of the solution to between about .85 N and 1.25 N on the basis of nitric acid and sulphuric acid present in addition to acid produced by the uranyl nitrate, whereby uranium remains in solution and the plutonium is precipitated with bismuth phosphate, and removing said precipitate from the solution.

4. The method of separating plutonium from substance present in neutron irradiated uranium which comprises dissolving said neutron irradiated material in nitric acid, adjusting the concentration of uranyl nitrate hexahydrate to about 22%, adding sulfuric acid to a concentration of about .85 to 1.25 N based on nitric and sulfuric acids present, and adding a soluble bismuth compound and a soluble phosphate to precipitate bismuth phosphate carrying the plutonium out of the solution.

5. In a process for the separation of plutonium from uranium in a solution in which the plutonium is present in the tetravalent state, the steps of forming a substantially insoluble bismuth phosphate in said solution whereby the plutonium becomes associated with the bismuth phosphate thus formed and removing said phosphate together with the associated plutonium from the solution.

6. A method of recovering a plutonium concentrate which comprises aging neutron irradiated uranium until plutonium is produced in substantial concentration, dissolving said neutron irradiated uranium to form an aqueous solution thereof containing plutonium in the tetravalent state, adjusting the acidity of the solution to a point to which said uranium will remain in solution in the presence of phosphate ion and separating plutonium by precipitating bismuth phosphate from said aqueous solution to associate said plutonium with the bismuth phosphate and carry said plutonium with said bismuth phosphate from the solution.

References Cited in the file of this patent
UNITED STATES PATENTS
2,206,634    Fermi et al. _____ July 2, 1940
OTHER REFERENCES Mellor: "Treatise on Inorganic and Theoretical Chemistry," volume IX (1929), p. 711.